United States Patent
Wu et al.

(10) Patent No.: US 11,488,422 B1
(45) Date of Patent: Nov. 1, 2022

(54) FLEET METRICS ANALYTICS REPORTING SYSTEM

(71) Applicant: Samsara Inc., San Francisco, CA (US)

(72) Inventors: Alvin Wu, Woodridge, IL (US); Muhammad Ali Akhtar, Oakland, CA (US); Nishant Raman, San Francisco, CA (US); Jevon Yeoh, San Francisco, CA (US); Saranyu Phusit, London (GB); Joanne Wang, Los Gatos, CA (US); Benjamin Chang, Oakland, CA (US); Katherine Lee, Fremont, CA (US); Jennifer Julia Zhang, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/354,762

(22) Filed: Jun. 22, 2021

(51) Int. Cl.
*G07C 5/00* (2006.01)
*G06F 16/9038* (2019.01)
*G07C 5/08* (2006.01)

(52) U.S. Cl.
CPC ......... *G07C 5/008* (2013.01); *G06F 16/9038* (2019.01); *G07C 5/085* (2013.01); *G07C 5/0816* (2013.01)

(58) Field of Classification Search
CPC ...... G07C 5/008; G07C 5/0816; G07C 5/085; G06F 16/9038
See application file for complete search history.

(56) References Cited

U.S. PATENT DOCUMENTS

| | | | | |
|---|---|---|---|---|
| 10,185,999 | B1 * | 1/2019 | Konrardy | G06Q 40/08 |
| 2013/0289873 | A1 * | 10/2013 | Mitchell | G06Q 10/08 |
| | | | | 701/482 |
| 2014/0214255 | A1 * | 7/2014 | Dolgov | G05D 1/0248 |
| | | | | 701/23 |
| 2019/0354939 | A1 * | 11/2019 | Song | G06Q 50/30 |
| 2021/0295215 | A1 * | 9/2021 | Acharya | G06Q 10/00 |

* cited by examiner

*Primary Examiner* — Donald J Wallace
(74) *Attorney, Agent, or Firm* — Schwegman Lundberg & Woessner, P.A.

(57) ABSTRACT

An analytics reporting system to perform operations that include: aggregating sensor data collected from a plurality of sensor devices within a database, the sensor data comprising a set of values that correspond with a metric; generating a threshold value based on the set of values that correspond with the metric; accessing a portion of the sensor data based on an identifier associated with the portion of the sensor data; determining the portion of the sensor data transgresses the threshold value; and generating a report that comprises a display of the portion of the sensor data based on the determining that the portion of the sensor data transgresses the threshold value.

20 Claims, 9 Drawing Sheets

300

AGGREGATING SENSOR DATA COLLECTED FROM A PLURALITY OF SENSOR DEVICES WITHIN A DATABASE, THE SENSOR DATA COMPRISING A SET OF VALUES THAT CORRESPOND WITH A METRIC
302

GENERATING A THRESHOLD VALUE BASED ON THE SET OF VALUES THAT CORRESPOND WITH THE METRIC
304

ACCESSING A PORTION OF THE SENSOR DATA BASED ON AN IDENTIFIER ASSOCIATED WITH THE PORTION OF THE SENSOR DATA
306

DETERMINING THAT THE PORTION OF THE SENSOR DATA TRANSGRESSES THE THRESHOLD VALUE
308

GENERATING A REPORT THAT COMPRISES A DISPLAY OF THE PORTION OF THE SENSOR DATA BASED ON THE DETERMINING THAT THE PORTION OF THE SENSOR DATA TRANSGRESSES THE THRESHOLD VALUE
310

```
┌─────────────────────────────────────────────────────────────┐
│          PLOTTING A DISTRIBUTION OF THE SET OF VALUES       │
│                             402                             │
└─────────────────────────────────────────────────────────────┘
                              │
                              ▼
┌─────────────────────────────────────────────────────────────┐
│  DETERMINING A CUTOFF VALUE BASED ON THE DISTRIBUTION OF THE│
│                        SET OF VALUES                        │
│                             404                             │
└─────────────────────────────────────────────────────────────┘
                              │
                              ▼
┌─────────────────────────────────────────────────────────────┐
│  DETERMINING THE THRESHOLD VALUE BASED ON THE CUTOFF VALUE  │
│                             406                             │
└─────────────────────────────────────────────────────────────┘
```

VIDEOS

WITH GREAT SAFETY COMES GREAT VIDEOS.
581 VIDEOS WERE UPLOADED FROM SAMSARA, WITH OVER 96 MINUTES OF FOOTAGE.

806

FUEL CONSUMPTION

YOUR FLEET AVERAGE FUEL CONSUMPTION THIS YEAR WAS

9.5MPG

| MOST FUEL-EFFICIENT DRIVERS | MOST FUEL-EFFICIENT VEHICLES |
|---|---|
| 1. KATHERINE ALBERTSON | 1. #VC-3921 |
| 2. MARCUS O'LEARY | 2. #DB-0002 |
| 3. AMANDA STILLER | 3. #V9-31 |
| 4. TOMÁS GUETERREZ | 4. #VHE-01 |

808

API INTEGRATIONS

YOU'VE ISSUED 239,981,387 API CALLS, WITH 4 TOTAL TOKENS ACTIVE IN 2020.

THAT PUTS YOU IN THE TOP 1% OF API USERS!

*FIG. 8*

FLEET METRICS ANALYTICS REPORTING SYSTEM

TECHNICAL FIELD

Embodiments of the present disclosure relate generally the field of fleet operation management systems for supporting operations of fleet vehicles and, more particularly, but not by way of limitation, to a system for generating and displaying fleet metrics reports.

BACKGROUND

"Fleet vehicles" are groups of motor vehicles owned or leased by a business, government agency or other organization. Such organization may often employ one or more fleet management systems to accumulate, store, process, monitor, report on, and export information gathered from or pertaining to a fleet of vehicles.

Conventional systems provide some features to manage the gathered information, but often lack the ability to effectively manage and report on high data volumes associated with large numbers of fleet vehicles. Often, the end user can be overwhelmed by the volume of information and the inability to drill into or identify relevant information while preserving context.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart depicting a method of generating a report of aggregated data, according to certain example embodiments.

FIG. 4 is a flowchart depicting a method of generating a threshold value based on aggregated data, according to certain example embodiments

FIG. 8 is an interface diagram depicting a report generated by an analytics reporting system, according to certain example embodiments.

DETAILED DESCRIPTION

Figure 1:
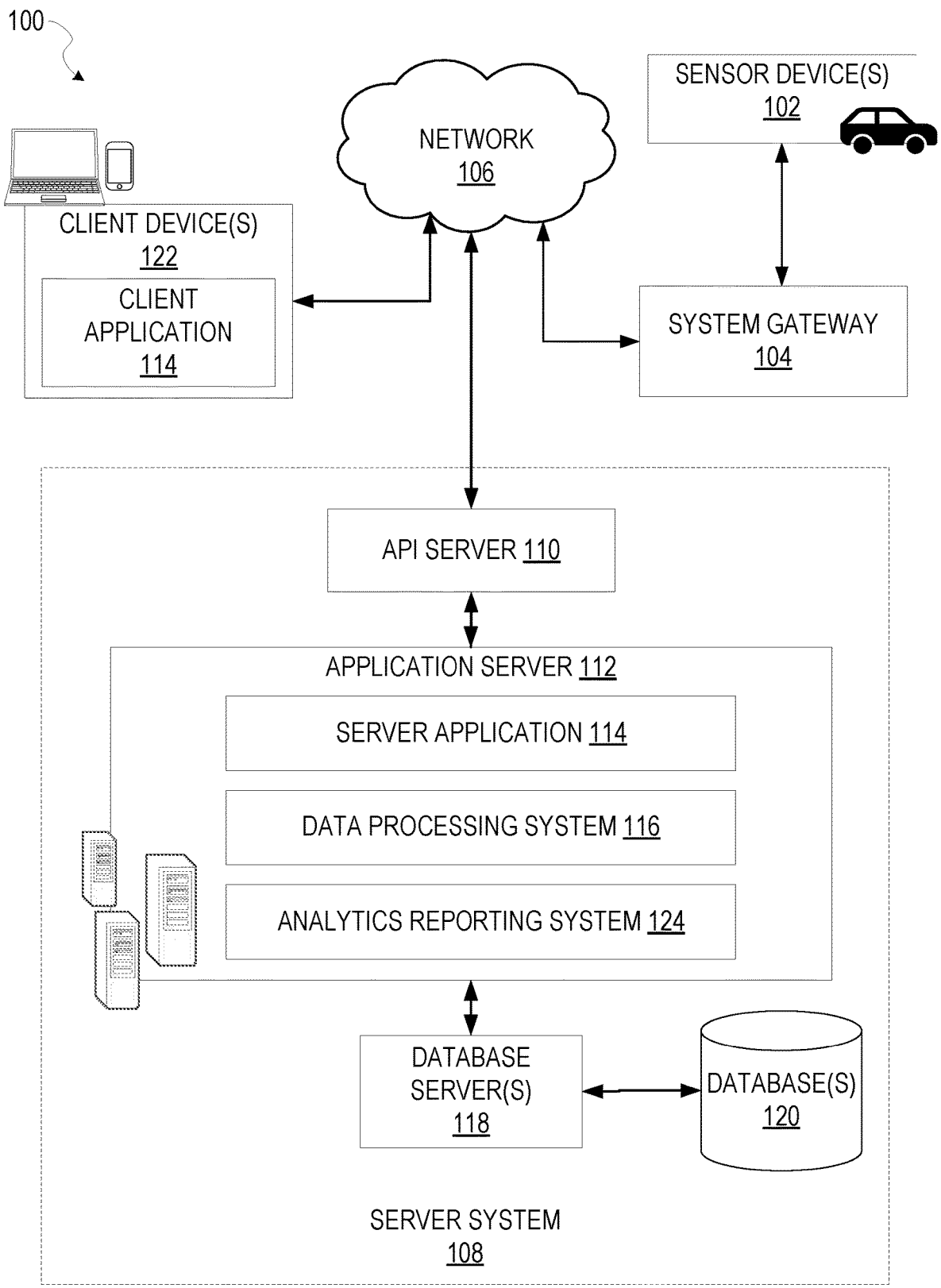
FIG. 1 is a block diagram showing an example system for exchanging data (e.g., sensor data and associated content) over a network in accordance with some embodiments, wherein the system includes a map-based notification system.

As discussed above, organizations may often employ the use of a fleet management system to manage information relevant to a fleet of vehicles. While helpful, such systems often lack the ability to effectively manage and report on high data volumes associated with large numbers of fleet vehicles, resulting in the end user within the organization to be overwhelmed by the volume of information and the inability to drill into or identify relevant information while preserving context. Accordingly, the disclosed system provides functionality to identify and present relevant information from among a voluminous collection of information.

As an illustrative example, an analytics reporting system may be configured to aggregate data collected from a plurality of sensor devices, wherein the plurality of sensor devices may themselves be associated with one or more fleet vehicles associated with one or more distinct organizations. In doing so, the analytics reporting system may analyze the aggregated data to define one or more thresholds associated with metrics represented by the aggregated data, in order to more accurately identify significant information to be reported to each of the organizations. For example, referencing information gathered from a single organization may fail to provide sufficient context in order to determine when a metric is of relative importance or interest. By referencing the aggregated data collected from the plurality of sensor devices, thresholds may more accurately be defined for the purposes of identifying and reporting "interesting" or relevant information.

Accordingly, the aggregated data may comprise a plurality of data objects from diverse sources and of diverse types. For example, the aggregated data may comprise a source identifier, or organization identifier, that identifies a source of the data object (i.e., a vehicle from among a fleet of vehicles), as well as an organization identifier/designator, wherein the organization identifier identifies an organization that the source of the data object may correspond to. As an illustrative example, a first fleet vehicle (i.e., "Vehicle A") may correspond with a first organization (i.e., "Organization A"), while a second fleet vehicle (i.e., "Vehicle B") may correspond with a second organization (i.e., "Organization B"). The aggregated data collected by the analytics reporting system may be generated by one or more sensor devices integrated into both Vehicle A and Vehicle B and utilized in combination to determine threshold values for a given metric. An administrator associated with Organization A may however be presented with a report of relevant data, wherein the relevant data presented within the report is generated solely via the one or more sensor devices associated with the corresponding vehicle, Vehicle A, but reported based on the thresholds defined on the aggregated data.

According to certain example embodiments, an analytics reporting system is configured to perform operations that include: aggregating sensor data collected from a plurality of sensor devices within a database, the sensor data comprising a set of values that correspond with a metric; generating a threshold value based on the set of values that correspond with the metric; accessing a portion of the sensor data based on an identifier associated with the portion of the sensor data; determining the portion of the sensor data transgresses the threshold value; and generating a report that comprises a display of the portion of the sensor data based on the determining that the portion of the sensor data transgresses the threshold value.

In certain example embodiments, the analytics reporting system may be configured to automatically generate and present a report of relevant information to an administrator associated with an organization over a predefined interval, wherein the interval may be a time period (i.e., weekly, monthly, annually, etc.), or in some embodiments may be based on a threshold metric (i.e., total miles driven).

In certain example embodiments, to generate the threshold value, the analytics reporting system may plot a distribution of all values associated with a given metric (i.e., distance traveled, total hours drive, total trips, number of alerts received, etc.), identify a top and bottom percentile of the distribution (i.e., top 20%), and define the threshold value based on a cutoff value occurring between the top and bottom percentile. In further embodiments, the threshold value may be generated based on an average value, median, or mean value associated with all values associated with the given metric.

Consider an illustrative example from a user perspective. Over the course of a year, an analytics reporting system aggregates information and data collected by a plurality of organizations, via one or more sensor devices that are integrated into fleet vehicles associated with each organization among the plurality of organizations. The data may for example include: mileage data, indicating a total number of miles driven by each of the fleet vehicles; trip data indicating a total number of completed trips of each fleet vehicles; driving time data, indicating a total number of hours driven by each fleet vehicle; as well as alerting data and notification data, indicating a number of "alerts" or "notifications" detected by the sensor devices of each fleet vehicle.

At the end of the year (or some other predefined period of time), the analytics reporting system accesses the aggregated data, and defines one or more threshold of the various metrics represented by the aggregated data. For example, the analytics reporting system may define a threshold value for a "miles driven" metric.

The analytics reporting system may then filter the aggregated data to identify a plurality of data objects associated with a specific organization from among the plurality of organizations represented within the aggregated data, and determines whether a portion of the data objects associated with the specific organization transgresses one or more of the defined thresholds. For example, upon determining that a total miles driven by a fleet of vehicles associated with an organization transgresses a threshold value defined by the analytics reporting system, the analytics reporting system generates a report that includes a display of the total miles driven to be presented at a client device associated with the organization.

FIG. 1 is a block diagram showing an example system 100 for detecting instances of speeding and rolling stops based on map data, according to certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device 102 and the system gateway 104. While certain functions of the system 100 are described herein as being performed by either a client application 114, the sensor device 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device 102, or system gateway 104, where there may be sufficient processing capacity.

The server system 108 supports various services and operations that are provided to the client application 114. Such operations include transmitting data to, receiving data from, and processing data generated by the client application 114, the sensor devices 102, and the system gateway 104. In some embodiments, the sensor devices 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor device 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an analytics reporting system 124. The analytics reporting system 124 is configured to perform operations that include: aggregating sensor data collected from a plurality of sensor devices within a database, the sensor data comprising a set of values that correspond with a metric; generating a threshold value based on the set of values that correspond with the metric; accessing a portion of the sensor data based on an identifier associated with the portion of the sensor data; determining the portion of the sensor data transgresses the threshold value; and generating a report that comprises a display of the portion of the sensor data based on the determining that the portion of the sensor data transgresses the threshold value, according to some example embodiments. Further details of the analytics reporting system 124 can be found in FIG. 2 below.

The server application 114 implements a number of data processing technologies and functions, particularly related to the aggregation and other processing of data (e.g., sensor data generated by the sensor device 102). As will be described in further detail, the sensor data, including odometer data points and GPS data points, generated by the sensor device 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor device 102 and processed by the server application 114.

Figure 2:
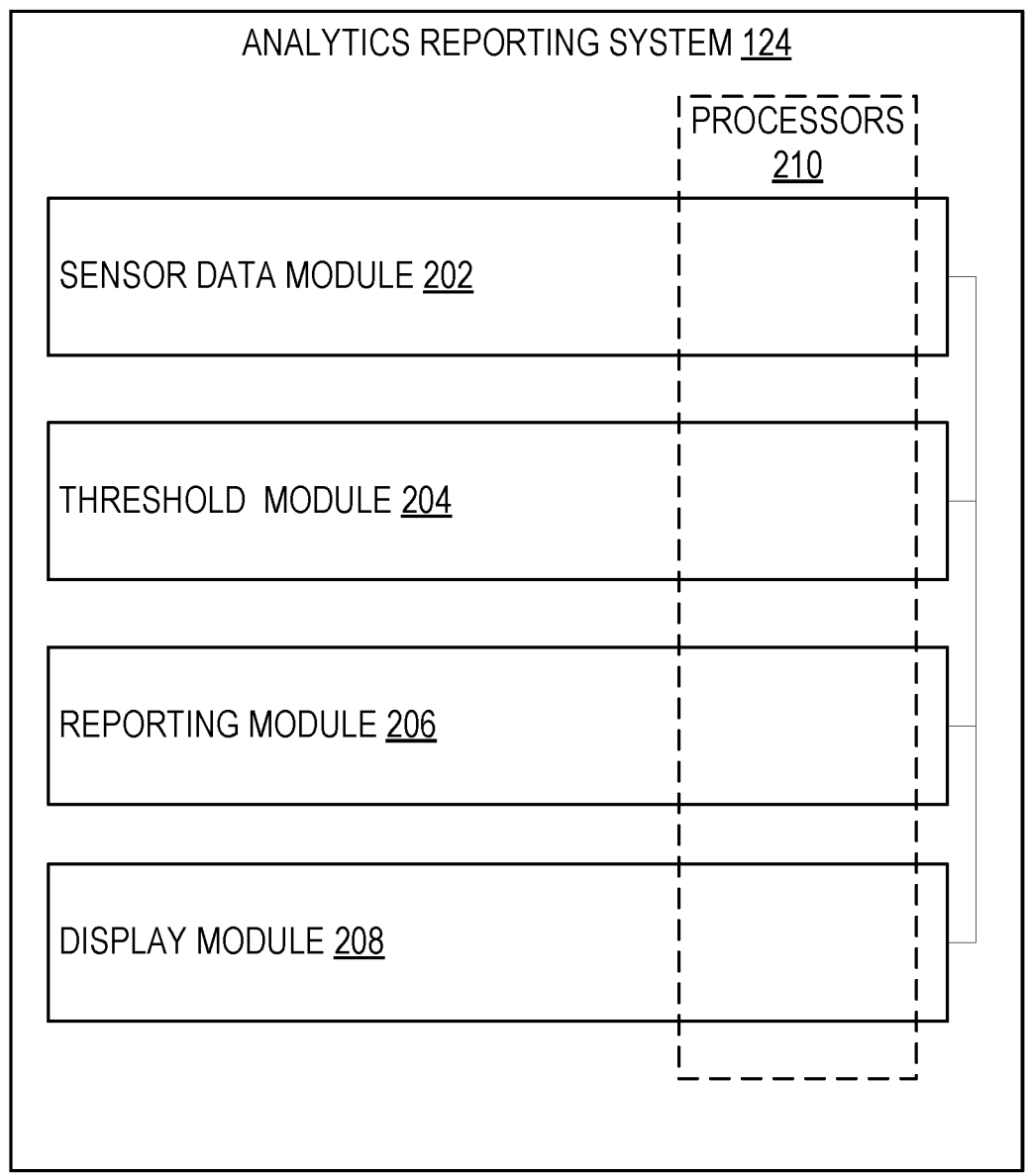
FIG. 2 is a block diagram illustrating various modules of a map-based notification system, according to certain example embodiments.

FIG. 2 is a block diagram 200 illustrating components of the analytics reporting system 124 that configure the analytics reporting system 124 to perform operations that include aggregating sensor data collected from a plurality of sensor devices within a database, the sensor data comprising a set of values that correspond with a metric; generating a threshold value based on the set of values that correspond with the metric; accessing a portion of the sensor data based on an identifier associated with the portion of the sensor data; determining the portion of the sensor data transgresses the threshold value; and generating a report that comprises a display of the portion of the sensor data based on the determining that the portion of the sensor data transgresses the threshold value, according to some example embodiments.

The analytics reporting system 124 is shown as including a sensor data module 202, a threshold module 204, a reporting module 206, and a display module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the analytics reporting system 124 may physically include an arrangement of one or more of the processors 210 (e.g., a subset of or among the one or more processors of the machine) configured to perform the operations described herein for that module. As another example, any module of the analytics reporting system 124 may include software, hardware, or both, that configure an arrangement of one or more processors 210 (e.g., among the one or more processors of the machine) to perform the operations described herein for that module. Accordingly, different modules of the analytics reporting system 124 may include and configure different arrangements of such processors 210 or a single arrangement of such processors 210 at different points in time. Moreover, any two or more modules of the analytics reporting system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 3 is a flowchart depicting a method 300 of generating a report of aggregated data, according to certain example embodiments. Operations of the method 300 may be performed by the modules described above with respect to FIG. 2. As shown in FIG. 3, the method 300 includes one or more operations 302, 304, 306, 308, and 310.

At operation 302, the sensor data module 202 aggregates sensor data collected from a plurality of sensor devices, wherein the sensor data comprises a set of values that correspond with a metric. For example, the sensor data may include mileage data, indicating a total number of miles driven by each of the fleet vehicles; trip data indicating a total number of completed trips of each fleet vehicles; driving time data, indicating a total number of hours driven by each fleet vehicle; as well as alerting data and notification data, indicating a number of "alerts" or "notifications" detected by the sensor devices of each fleet vehicle. In some embodiments, the sensor data module 202 may aggregate the sensor data within one or more databases 120.

At operation 304, the threshold module 204 generates a threshold values based on the set of values that correspond with the metric. In some embodiments, to generate the threshold value, the threshold module 204 plots a distribution of all values associated with a given metric (i.e., distance traveled, total hours drive, total trips, number of alerts received, etc.), identifies a top and bottom percentile of the distribution (i.e., top 20%), and defines the threshold value based on a cutoff value occurring between the top and bottom percentile. In further embodiments, the threshold value may be generated based on an average value, median, or mean value associated with all values associated with the given metric. As an illustrative example, the threshold defined by the threshold module 204 may include a minimum distance value (i.e., 1,000 miles), or a minimum temporal value (i.e., 1,000 hours), wherein the metric represents a total distance traveled by a fleet of vehicles, or a total time driven by a fleet of vehicles.

At operation 306, the sensor data module 202 access a portion of the sensor data based on an identifier associated with the portion of the sensor data. For example, the identifier may identify an organization associated with one or more fleet vehicles and corresponding sensor devices. Accordingly, in such embodiments, the sensor data may comprise corresponding organization identifiers.

At operation 308, the threshold module 204 determines that the portion of the sensor data that corresponds with the organization transgresses the threshold value. At operation 310, responsive to determining that the portion of the sensor data that corresponds with the organization transgresses the threshold value, the reporting module 206 generates a report that comprises a display of the portion of the sensor data.

FIG. 4 is a flowchart depicting a method 400 of generating a threshold value based on aggregated data, according to certain example embodiments. Operations of the method 400 may be performed by the modules described above with respect to FIG. 2. In some embodiments, the method 400 may be performed as a subroutine of one or more operations of the method 300, such as operation 304. As shown in FIG. 4, the method 400 includes one or more operations 402, 404, and 406.

At operation 402, the threshold module 204 plots a distribution of the set of values that correspond with the metric. For example, the sensor data module 202 may access the aggregated data, and identify a subset of the aggregated data that corresponds with a metric, based on properties/attributes of the subset of the aggregated data. The threshold module 204 may then plot a distribution of the subset of the aggregated data.

At operation 404, the threshold module 204 identifies a top and bottom percentile of the distribution (i.e., top 20%), and determines a cutoff value. For example, the cutoff value may be represented as the value that occurs at the threshold between the top percentile (i.e., 20%) of the subset of the aggregated data and the bottom percentile (i.e., 80%) of the subset of the aggregated data. In some embodiments, a user (such as an administrator) of the analytics reporting system 124 may provide an input that defines top and bottom percentile values for one or more metrics represented by the aggregated sensor data, or likewise may simply provide an input to define the threshold value itself. At operation 406, the threshold module 204 defines the threshold value of the metric based on the cutoff value.

Figure 5:
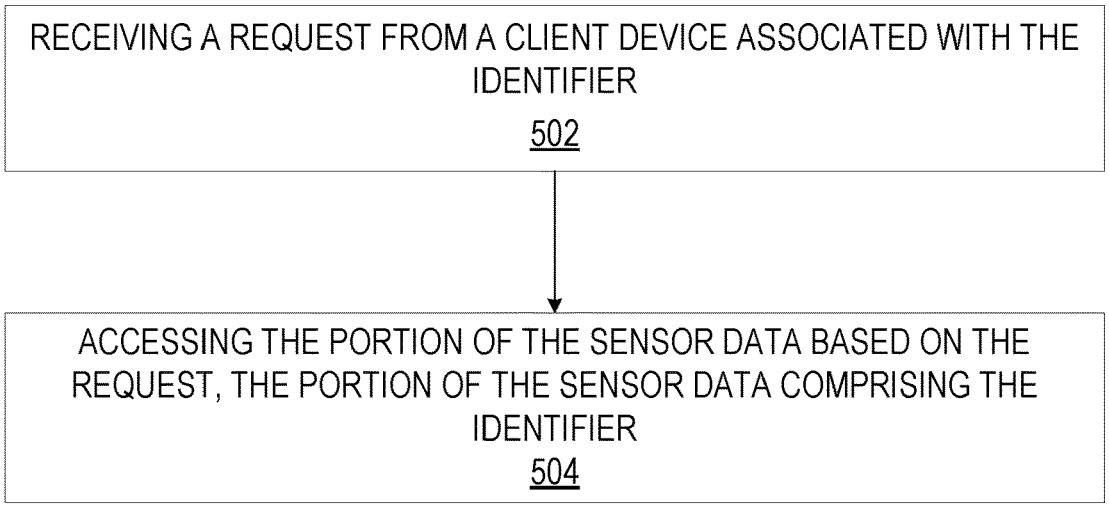
FIG. 5 is a flowchart depicting a method of generating a report of aggregated data, according to certain example embodiments.

FIG. 5 is a flowchart depicting a method 500 of generating a report based on aggregated data, according to certain example embodiments. Operations of the method 500 may be performed by the modules described above with respect to FIG. 2. In some embodiments, the method 500 may be performed as a subroutine of one or more operations of the method 300, such as operation 310. As shown in FIG. 5, the method 500 includes one or more operations 502, and 504.

At operation 502, the reporting module 206 receives a request from a client device 122. For example, the client device 122 may be associated with an identifier, such as an organization identifier. In such embodiments, a portion of the aggregated sensor data may originate from one or more sensor devices associated with the organization identified by the identifier and may therefor include the identifier.

At operation 504, the reporting module 206 accesses the database 120 to identify the portion of the aggregated sensor data based on the identifier associated with the client device 122. Accordingly, the display module 208 may generate and cause display of a report based on the portion of the aggregated sensor data.

Figure 6:
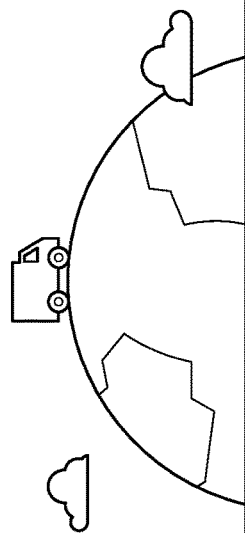
FIG. 6 is an interface diagram depicting a report generated by an analytics reporting system, according to certain example embodiments.

FIG. 6 is an interface diagram 600 depicting a report 602 generated by the analytics reporting system 124, according to certain example embodiments, and as discussed in the method 300, 400, and 500 as depicted in FIGS. 3, 4, and 5. As seen in the interface diagram 600, the report 602 may include a display of sensor data 604. For example, as seen in FIG. 6, the sensor data 604 may represent metrics that include: a total driving time associated with a fleet of vehicles; an average distance traveled per vehicle by a fleet of vehicles; a total number of trips completed by a fleet of vehicles; and a longest trip traveled by a vehicle from among a fleet of vehicles.

Figure 7:
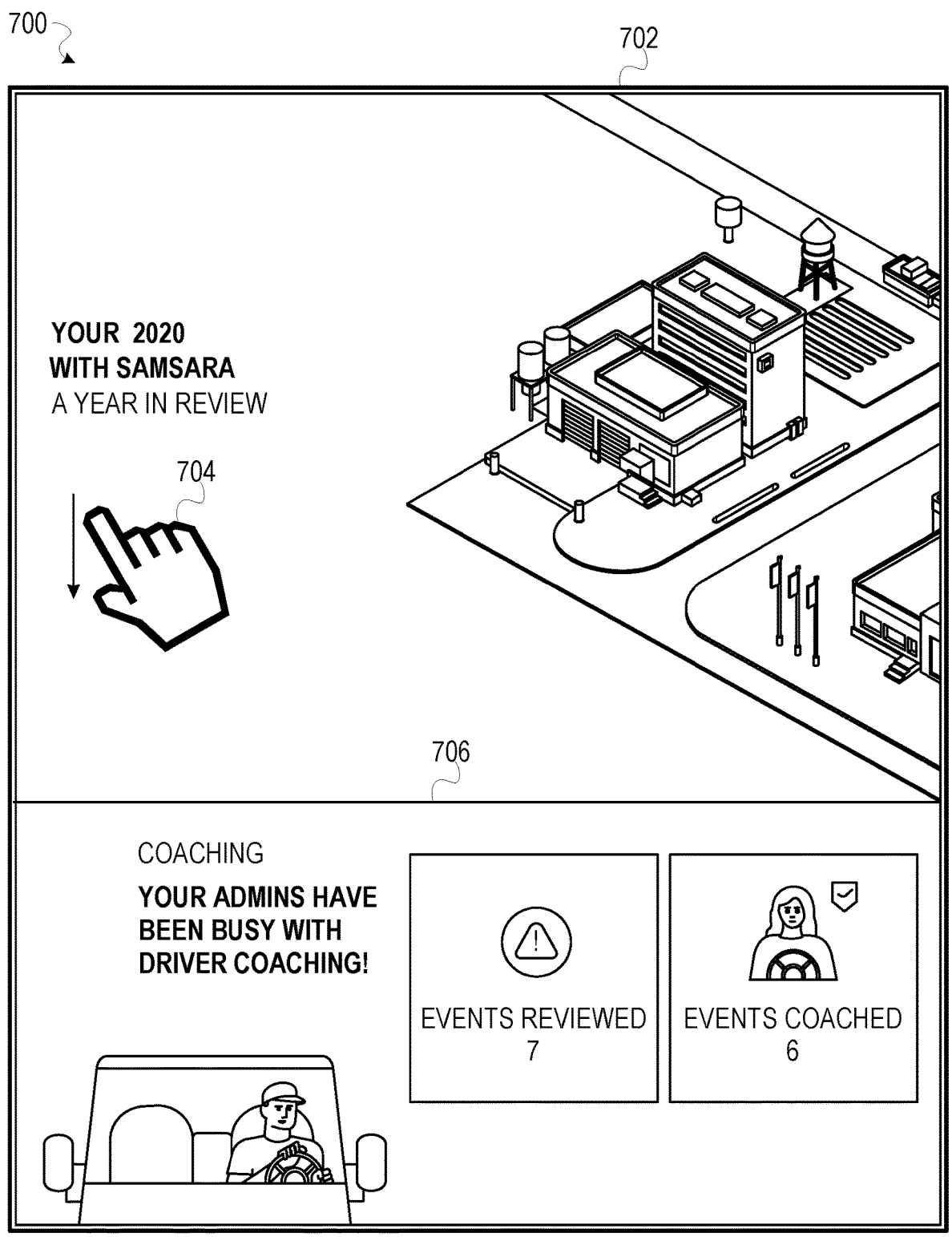
FIG. 7 is an interface diagram depicting a report generated by an analytics reporting system, according to certain example embodiments.

FIG. 7 is an interface diagram 700 depicting a report 702 generated by an analytics reporting system 124, according to certain example embodiments. As seen in the interface diagram 700, a user of a client device may provide an input 704 to scroll through the report 702. Accordingly, in certain embodiments, the report 702 may comprise a plurality of report sub-sections, such as sub-section 706, wherein each sub-section among the plurality of sub-sections comprises a display of sensor data that corresponds with a metric.

For example, as seen in the interface diagram 700, sub-section 706 comprises sensor data that represents a number of "events" reviewed and coached by administrators associated with a given organization. Accordingly, as seen in the interface diagram 800 of FIG. 8, the sub-sections may be presented in sequence, such that a user may provide an input, such as the input 704, to scroll through the sub-sections and review the corresponding metrics represented by the sensor data.

FIG. 8 is an interface diagram 800 depicting a report 802 generated by an analytics reporting system 124, according to certain example embodiments. As seen in the interface diagram 800, the report 802 may comprise a plurality of sub-sections, such as sub-section 804, sub-section 806, and sub-section 808, wherein each sub-section among the plurality of sub-sections provides a display of sensor data associated with a distinct metric from among a plurality of metrics represented by the sensor data.

Figure 9:
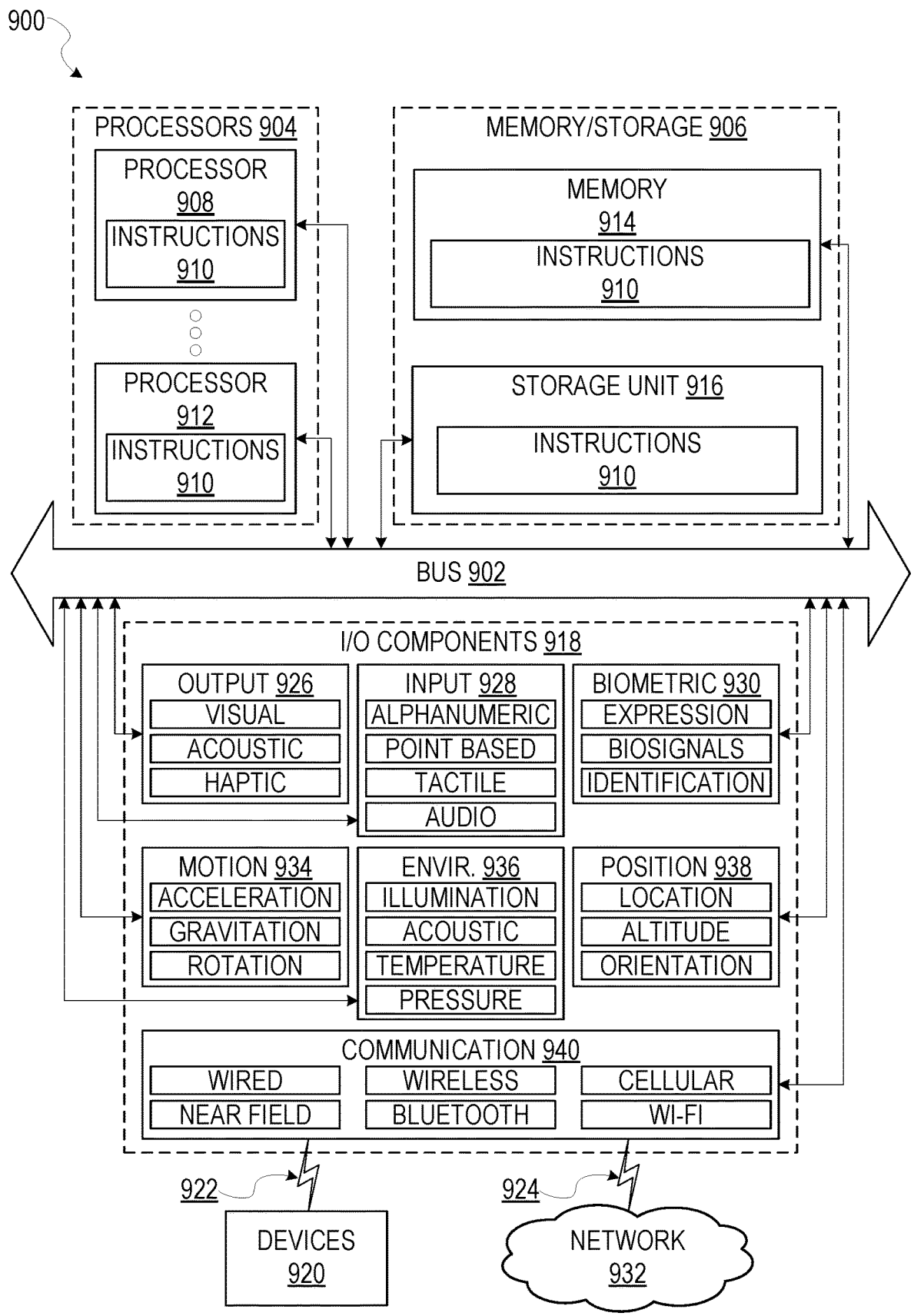
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   aggregating sensor data collected from a plurality of sensor devices within a database, the sensor data comprising a set of values that correspond with a metric;
   generating a threshold value based on the set of values that correspond with the metric;
   accessing a portion of the sensor data based on an identifier associated with the portion of the sensor data;
   determining the portion of the sensor data transgresses the threshold value;
   generating a report that comprises a display of the portion of the sensor data based on the determining that the portion of the sensor data transgresses the threshold value;
   identifying an organization that corresponds with the portion of the sensor data based on the identifier; and
   causing display of a presentation of the report at a client device associated with the organization identified by the identifier.

2. The method of claim 1, wherein the generating the threshold value based on the set of values that correspond with the metric includes:
   plotting a distribution of the set of values;
   determining a cutoff value based on the distribution of the set of values; and
   defining the threshold value based on the cutoff value.

3. The method of claim 2, wherein the determining the cutoff value includes:
   receiving an input that selects the cutoff value.

4. The method of claim 2, wherein the determining the cutoff value includes:
   receiving an input that defines a top percentile value;
   identifying a top percentile of the set of values based on the distribution of the set of values and the top percentile value; and
   determining the cutoff value based on the top percentile.

5. The method of claim 1, wherein the generating the threshold value includes:
   determining an average value based on the set of values.

6. The method of claim 1, wherein the report includes a presentation of the identifier associated with the portion of the sensor data.

7. The method of claim 1, wherein the accessing the portion of the sensor data based on the identifier associated with the portion of the subset of the sensor data includes:
   receiving a request from a client device associated with the identifier; and
   accessing the portion of the sensor data based on the request.

8. A system comprising:
   a memory; and
   at least one hardware processor to perform operations comprising:
   aggregating sensor data collected from a plurality of sensor devices within a database, the sensor data comprising a set of values that correspond with a metric;
   generating a threshold value based on the set of values that correspond with the metric;
   accessing a portion of the sensor data based on an identifier associated with the portion of the sensor data;
   determining the portion of the sensor data transgresses the threshold value;
   generating a report that comprises a display of the portion of the sensor data based on the determining that the portion of the sensor data transgresses the threshold value;
   identifying an organization that corresponds with the portion of the sensor data based on the identifier; and
   causing display of a presentation of the report at a client device associated with the organization identified by the identifier.

9. The system of claim 8, wherein the generating the threshold value based on the set of values that correspond with the metric includes:
   plotting a distribution of the set of values;
   determining a cutoff value based on the distribution of the set of values; and
   defining the threshold value based on the cutoff value.

10. The system of claim 9, wherein the determining the cutoff value includes:
    receiving an input that selects the cutoff value.

11. The system of claim 9, wherein the determining the cutoff value includes:
    receiving an input that defines a top percentile value;
    identifying a top percentile of the set of values based on the distribution of the set of values and the top percentile value; and
    determining the cutoff value based on the top percentile.

12. The system of claim 8, wherein the generating the threshold value includes:
    determining an average value based on the set of values.

13. The system of claim 8, wherein the report includes a presentation of the identifier associated with the portion of the sensor data.

14. The system of claim 8, wherein the accessing the portion of the subset of the sensor data based on the identifier associated with the portion of the sensor data includes:

receiving a request from a client device associated with the identifier; and accessing the portion of the sensor data based on the request.

15. A non-transitory machine-readable storage medium comprising instructions that, when executed by one or more processors of a machine, cause the machine to perform operations comprising:

aggregating sensor data collected from a plurality of sensor devices within a database, the sensor data comprising a set of values that correspond with a metric;

generating a threshold value based on the set of values that correspond with the metric;

accessing a portion of the sensor data based on an identifier associated with the portion of the sensor data;

determining the portion of the sensor data transgresses the threshold value;

generating a report that comprises a display of the portion of the sensor data based on the determining that the portion of the sensor data transgresses the threshold value;

identifying an organization that corresponds with the portion of the sensor data based on the identifier; and causing display of a presentation of the report at a client device associated with the organization identified by the identifier.

16. The non-transitory machine-readable storage medium of claim 15, wherein the generating the threshold value based on the set of values that correspond with the metric includes:

plotting a distribution of the set of values;

determining a cutoff value based on the distribution of the set of values; and defining the threshold value based on the cutoff value.

17. The non-transitory machine-readable storage medium of claim 16, wherein the determining the cutoff value includes:

receiving an input that selects the cutoff value.

18. The non-transitory machine-readable storage medium of claim 16, wherein the determining the cutoff value includes:

receiving an input that defines a top percentile value;

identifying a top percentile of the set of values based on the distribution of the set of values and the top percentile value; and determining the cutoff value based on the top percentile.

19. The non-transitory machine-readable storage medium of claim 15, wherein the generating the threshold value includes:

determining an average value based on the set of values.

20. The non-transitory machine-readable storage medium of claim 15, wherein the report includes a presentation of the identifier associated with the portion of the sensor data.

* * * * *